United States Patent [19]

Heusi et al.

[11] Patent Number: 4,894,512
[45] Date of Patent: Jan. 16, 1990

[54] METHOD AND DEVICE FOR UNDERWATER ELECTRICAL WELDING

[75] Inventors: Rey Henri, Colmar; Bernard Durand, Marseille; Philippe Blanchard, Draveil, all of France

[73] Assignees: Electricite De France (Service National), Paris; Compagnie Maritime D'Expertises, Marseille-Cedex, both of France

[21] Appl. No.: 213,389

[22] Filed: Jun. 30, 1988

[30] Foreign Application Priority Data

Jul. 1, 1987 [FR] France .................................. 87 09438

[51] Int. Cl.⁴ .............................................. B23K 9/06
[52] U.S. Cl. ..................................... 219/130.4; 219/72
[58] Field of Search ................................ 219/72, 130.4

[56] References Cited

U.S. PATENT DOCUMENTS 2,770,710 11/1956 Burkart ................................. 219/75
2,784,349 3/1957 Anderson ........................... 219/130.4
3,632,950 1/1972 Berghof ................................ 219/72
4,182,947 1/1980 Brower ................................. 219/72
4,292,497 9/1981 Paton et al. ...................... 219/130.51

OTHER PUBLICATIONS

"Deep Hyperbaric Welding. Mechanization/Automation," by H. O. Knagenhjelm, International Conference on Underwater Welding, Jun. 27-28, 1983, pp. 341-348.

Primary Examiner—Clifford C. Shaw
Attorney, Agent, or Firm—Fleit, Jacobson, Cohn, Price, Holman & Stern

[57] ABSTRACT

Method of underwater arc welding comprising the steps of placing a welding electrode nearby a parent material to be welded, immerged in water; generating a high frequency voltage between the electrode and the parent material for starting a striking arc and supplying a high frequency current to said electrode, after said striking arc has been initiated; generating a welding voltage for producing a weld at the parent material and; simultaneously sustaining the high frequency current, superimposed to the welding current, for stabilizing said welding arc during the time duration of the underwater arc welding.

8 Claims, 2 Drawing Sheets

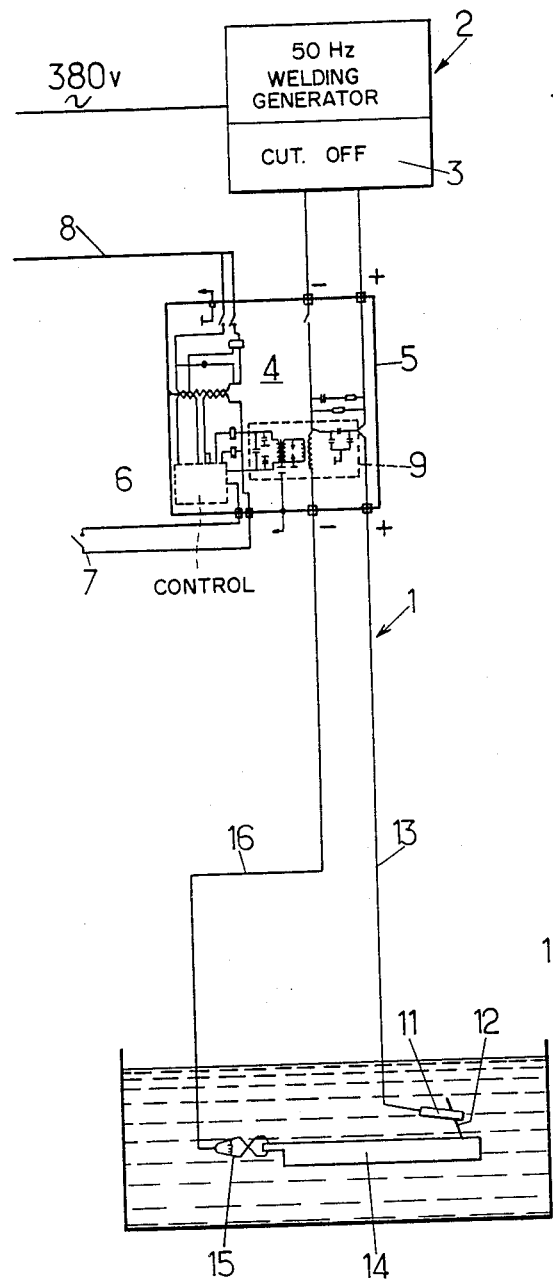
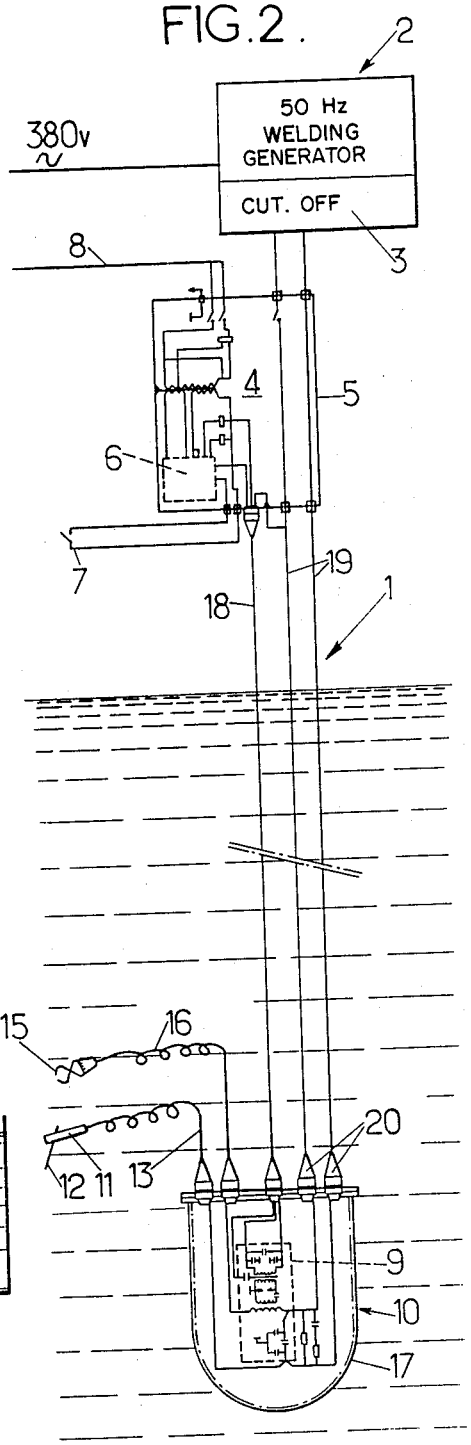
FIG.1.
FIG.2.

METHOD AND DEVICE FOR UNDERWATER ELECTRICAL WELDING

BACKGROUND OF THE INVENTION

The present invention relates to a method and device for electric arc welding, underwater or within a liquid.

The method is particularly suitable although not exclusively, in the field of submerged welding in deep water with a coated electrode to be used on carbon or stainless steels.

In general, underwater electric welding or welding in "deep water", is a difficult operation, which necessitates considerable precautions due to the risks undertaken by the diving welder associated on the one hand with diving, and on the other hand with presence of electricity. Poor visibility, floating condition for the diving welder which lead to irregular and inaccurate movements, molten metal rapid cooling, slag rapid cooling if so, render fusion bath control by the welder more difficult.

Different methods and devices for underwater electrical welding are already known. Their field of application is however limited and these methods are no longer satisfactory under certain conditions like for example: with austenitic electrodes, in case of thin walls welding or welding at great depth, etc. Good quality weldings are thus not obtained. In fact, due to high ionization potential of water and the pressure exerted by water on the welding arc, the striking and sustaining of said welding arc are difficult to obtain. In case of extinction, due to electrode cooling, water does not permit easy restriking of the arc either. And when there are frequent stops and welding resumptions by the welder, welds obtained show unacceptable cracks, porosities, blisters and/or occlusions of impurities.

SUMMARY OF THE INVENTION

It is an object of the present invention to provide an improved method and corresponding device for underwater welding; it is a more particular object to provide a method and device which facilitate underwater welding by facilitating striking and by diminishing the extinction risks of the arc, and thus permitting an improved quality of the weldings obtained.

The diving welder has a better control of the melting bath, operates more quickly, with less interruptions, and thus undertakes less risk and during a shorter time.

To this end, the present invention provides an underwater electric arc welding method comprising the steps of:

placing a welding electrode nearby a parent material to be welded, immerged in water, generating a high frequency voltage between said electrode and said parent material for starting a striking arc between said electrode and said parent material, and thus supplying a high frequency current to said electrode, after said striking arc has been initiated, generating a welding voltage between said electrode and said parent material supplying a nominal welding current to said electrode, for producing a weld at said parent material, and simultaneously sustaining the high frequency current, superimposed to the welding current, for stabilizing said welding arc during the time duration of the underwater arc welding.

The high frequency current is typically smaller by several orders of magnitude than the welding current.

The invention also provides an underwater arc welding device for welding a parent material immerged in water, comprising:

an electrode holder, means for supplying normal welding current to the electrode holder for producing a welding arc between an electrode to be hold by said electrode holder and said parent material, and electronic means for supplying a high frequency current to the electrode holder for starting and sustaining said welding arc with said high frequency current superimposed to the welding current, said electronic means comprising a fluidtight immersible high frequency voltage generator, and a fluidtight cable sealingly connecting said generator to the electrode holder and having a length less than 5 meters.

SHORT DESCRIPTION OF THE DRAWINGS

The invention will be better understood from reading the following description of a particular embodiment, given by way of non-limitative example.

The description refers to the accompanying drawings, in which:

FIG. 1 is a diagrammatic view of a device according to the invention, whose high frequency generator is situated above the water surface;

FIG. 2 is a diagrammatic view of a device according to the invention comprising an immersible high frequency generator;

DESCRIPTION OF A PREFERRED EMBODIMENT

Figure 3:
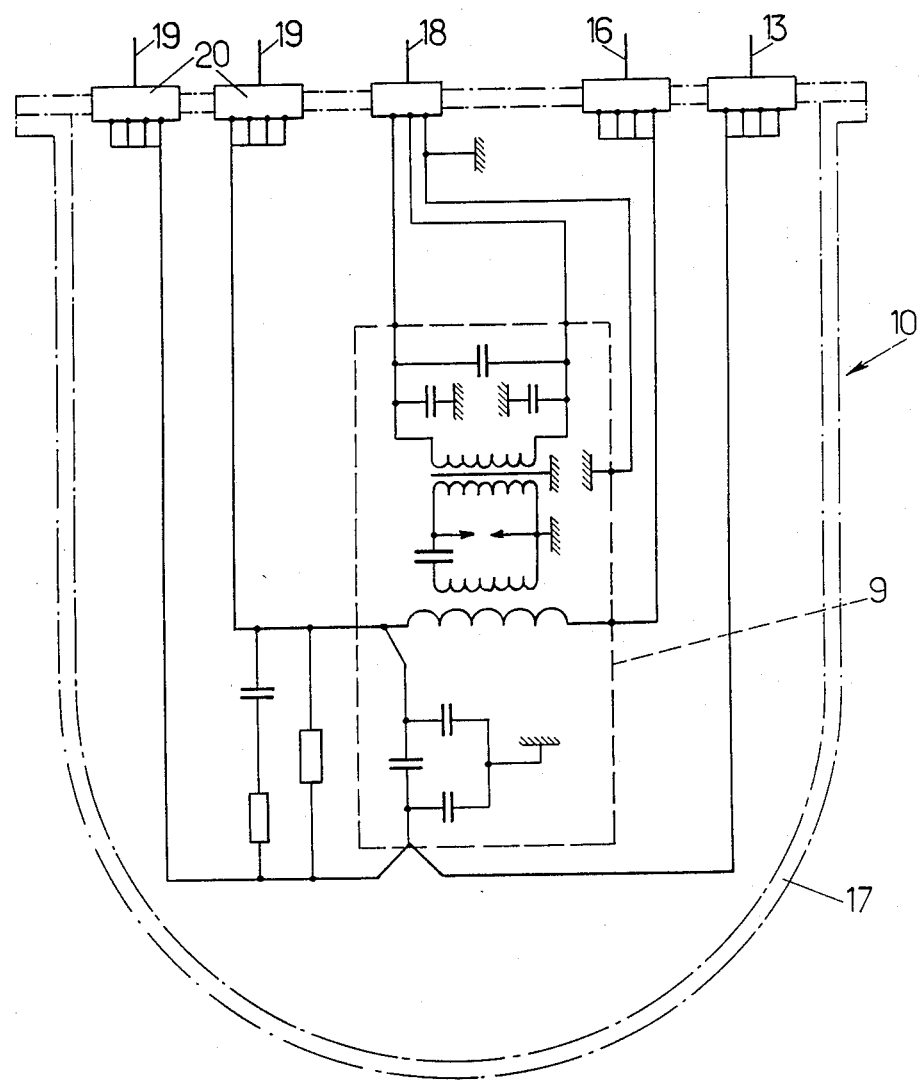
FIG. 3 is a diagrammatic view of an immersible high frequency generator according to the invention.

The underwater welding device 1 shown in FIGS. 1 and 2 comprises a welding generator 2, for example supplied with 380 Volt three-phase current with a frequency of 50 Hz. The immersible welding generator 2 advantageously comprises an open circuit voltage cut off apparatus 3 which eliminates part of the risks of electrocution for the diver situated in the path of any leakage currents, and on the other hand, the risk of inadvertently starting the arc outside the weld joint. In fact, in case of a welding arc cut off, the welding generator generates between the electrode and the parent material an open circuit voltage of the order of 60 to 100 volts which it is preferable to avoid.

The welding generator is known per se and is defined by its static characteristics $[U=f(I)]$ and its dynamic characteristics $[I=f(u,t]$ which are selected to correspond to predetermined and particular conditions of the specific underwater welding to perform.

The device 1 comprises a welding control unit 4 (contained in a box 5 placed at the surface). This unit is known per se and comprises, for example, a programmable control card 6, and is provided with a manual control trigger 7. The unit 4 is supplied at 8 with 220 Volts or equivalent.

According to the invention, the device 1 comprises an HT/HF (high voltage/high frequency) generator 9, for example incorporated in box 5 at the surface (FIG. 1) or in an immersible fluidtight box 10 (FIG. 2). The welding may be programmed in the card 6 or be carried out as explained in detail below.

The HF generator has the drawback of generating interferences by conduction through connecting cables and by electromagnetic waves. It is hence advantageous to provide an interference suppression filter (not shown) upstream of box (5 or 10) of the HF generator to protect the welding generator 2 against the high frequency transmitted by conduction. Electromagnetic waves radiation is stopped by shields generally constituted with metal plates for the device, and steel braids for the connecting cables.

In the case of a fluidtight HF generator 10 suitable for immersion (FIG. 2), water which is less permeable to electromagnetic waves than air, constitutes a protection between the HF generator and the welding generator 2.

The device 1 comprises an electrode holder or torch 11 carrying the welding electrode 12 and connected, positively or negatively according to the type of electrode, by a fluidtight shielded cable 13, to the welding generator via the HF generator. The parent material or part to be welded 14 is, in this case, placed at reverse polarity with grounding clamp 15 and a fluidtight shielded cable 16 connected to the welding generator via the HF generator.

FIG. 3 shows diagrammataically the immersible HF generator according to a preferred embodiment of the invention. This generator comprises an outer fluidtight casing 17 and the generator circuit of high frequency/high voltage 9 (within the dashed lines on the FIGS.) supplied with low voltage, for example 24 Volts, from the surface through the LV (Low Voltage) cable 18 from the supply box 5. The high frequency generator 9 is constituted in manner known per se and as shown in the Figures.

The immersible HF generator is connected to the supply box 5 through fluidtight and shielded cables 19, for example, removable by means of sealed plug-in connectors 20, the electrode holder 11 and the grounding clamp 15 being connected to the box 10 of the HF generator by fluidtight cables, respectively 13 and 16, of short length of a few meters, for example 5 m in length.

The immersible HF generator permits the length of the cables 13 and 16 to be limited and hence limits attenuation of the power delivered to the striking and sustaining arc, thus improving the efficiency of the method.

The underwater welding method of the invention is described below. It comprises three successive phases: starting, nominal welding and, finally, arc stopping.

The diving welder being in position to start his welding, places the end of his electrode at the point where he must strike his arc.

He then informs the operator located above the water surface, that he is ready to start. The operator at the surface switches on the HV/HF generator, which delivers a high frequency voltage to the supply cables 13, 16 of the electrode holder 11 and the grounding clamp 15. This high frequency voltage creates a pilot or striking arc between the electrode and the parent material or part to be welded through a film of water and as the case may be, the protective coating of the electrode.

The diving welder, by means of the pilot arc, then locates perfectly the striking point on the part to be welded. He confirms to the surface operator that he is ready to start the welding arc.

The operator actuates the trigger 7 which switches on the welding contactor and delivers the voltage from the welding generator 2 between the electrode 12 and the part to be welded 14. The water being ionized by the pilot arc, the striking of the high intensity arc is almost instantaneous. The high voltage/high frequency is the same polarity than the electrode.

During the second phase of the method, i.e. during the welding, the high voltage/high frequency is maintained thus permitting obtention of a stabilized arc, reducing the spitting of molten metal, avoiding arc interruptions, and enabling the welding current to be reduced which thus permits assembly on thin sheet metal without collapse. In addition, these factors favour the regular melting of the coating of the electrode which, by forming a sheath around the arc, reduces the dazzling of the welder and therefore facilitates better guidance of the electrode within the bevel cut.

All these factors enable the quality of the welds to be condiderably improved with respect to conventional methods.

Advantageously, a high voltage is used which is associated with a very low current, for example of the order of 1 mA, in order to operate without risk for the welder. The high frequency applied in the invention is a frequency comprised between 100 KHz and 10 MHz and preferably around 1,5 MHz. Its rms value is advantageously comprised between 1000 and 10,000 Volts, for example 4000 Volts, the current generated being preferably alternating or pulsed.

During the tests which have permitted to discover the important advantages of stabilization of the welding arc with a coated electrode, according to the invention, specially good results have been obtained surprisingly with a unidirectional voltage for the welding current and in particular a pulsed current. Such welding currents are therefore advantageously used in the invention.

Finally, the last phase is the stopping of the arc, which can be performed in two ways:

the welder suddenly separates the electrode from the part to be welded and the arc is extenguished by itself. The surface operator then cuts the open circuit voltage of the generator by releasing the trigger 7, then stops supply of high frequency at box 5.

the welder orders the surface operator to cut off the welding current. The surface operator releases the trigger 7 and the welding contactor opens cutting off the arc and the open circuit voltage. The supply of the high voltage generator is then cut off by the surface operator.

We claim:

1. Method of underwater arc welding comprising the steps of:
   placing a welding electrode nearby a parent material to be welded, immerged in water,
   generating a high frequency voltage between said electrode and said parent material for starting a striking arc between said electrode and said parent material through said water, and thus supplying a high frequency current to said electrode, after said striking arc has been initiated.
   generating a welding voltage between said electrode and said parent material supplying a nominal welding current to said electrode, for producing a weld at said parent material, and
   sustaining the high frequency current superimposed to the welding current and much smaller than the welding current, for stabilizing said welding arc across a film of said water during the whole time duration of the underwater arc welding.

2. Method according to claim 1, wherein the high frequency voltage is comprised between 100 kHz and 10 MHz.

3. Method according to claim 1, wherein the high frequency voltage has an rms value, comprised between 1,000 and 10,000 Volts.

4. Method according to claim 1, wherein the welding voltage is unidirectional.

5. Method according to claim 1, wherein the welding voltage is pulsed.

6. Method of underwater arc welding comprising the steps of:
- placing a welding electrode nearby a parent material to be welded, immerged in water,
- generating a high frequency voltage between said electrode and said parent material and initiating a pilot striking arc through a film of water between said electrode and said parent material for ionizing said film of water,
- maintaining said high frequency voltage applied to said electrode after said pilot striking arc has been initiated for circulating a high frequency current across said film,
- generating a unidirectional or pulses welding voltage between said electrode and said parent material for striking a high intensity arc and circulating a nominal welding current through said electrode across the ionized film of water producing a weld at said parent material, and
- sustaining the high frequency current, superimposd to the welding current and smaller than the welding current by several orders of magnitude, for stabilizing said welding arc during the whole time duration of the underwater arc welding.

7. Underwater arc welding device, for welding a parent material immerged in water, comprising:
- an electrode holder,
- means for supplying normal welding current to the electrode holder for producing a welding arc between an electrode to be held by said electrode holder and said parent material, and
- electronic means for supplying a high frequency current to the electrode holder for starting and sustaining said welding arc with said high frequency current superimposed to the welding current, said electronic means comprising a fluid-tight, immersible high frequency voltage generator, and a fluid tight cable sealingly connecting said generator to the electrode holder and having a length less than 5 meters, wherein:
- said electronic means are arranged to deliver a high frequency current at a frequency comprised between 100 kHz and 10 MHz with a rms value of from 1000 to 10,000 Volts and an electric current in the milliampere range, and
- said means for supplying a normal welding current are arranged for delivering a welding current having a value greater than the high frequency current by several orders of magnitude.

8. Device according to claim 7, wherein said high frequency voltage generator is connected to an electric supply located above water level and delivering a low voltage via a low voltage cable.

* * * * *